United States Patent [19]

Shwayder

[11] 4,156,374

[45] May 29, 1979

[54] PRE-FORMED WEAR PADS FOR DRILL STABILIZERS

[76] Inventor: Warren M. Shwayder, 2335 E. Lincoln, Birmingham, Mich. 48008

[21] Appl. No.: 888,142

[22] Filed: Mar. 20, 1978

[51] Int. Cl.² ............................ B21K 5/02; F16C 1/26
[52] U.S. Cl. ................................. 76/108 A; 308/4 A; 175/325; 29/401 R
[58] Field of Search .......... 308/4 A, DIG. 8, DIG. 9; 175/325; 166/241; 76/101 A, 101 E, 101 R, 108 R, 108 A, DIG. 11; 29/401 R, 423, 424, 527.6

[56] References Cited

U.S. PATENT DOCUMENTS

| 3,268,274 | 8/1966 | Ortloff et al. | 308/4 A |
| 3,348,295 | 10/1967 | Bass, Jr. | 29/401 R |
| 3,454,308 | 7/1969 | Kennedy | 308/4 A |
| 4,081,203 | 3/1978 | Fuller | 308/4 A |

Primary Examiner—Nicholas P. Godici
Assistant Examiner—Roscoe V. Parker
Attorney, Agent, or Firm—Cullen, Sloman, Cantor, Grauer, Scott & Rutherford

[57] ABSTRACT

Hard surfacing the wear surface of rib-type stabilizers formed on drill strings by welding pre-formed wear pads upon the stabilizers. The pads are made of flattened, steel tube-like, thin wall, sheaths, filled with a matrix formed of hard carbide particles and a soft alloy binder. After welding each pad in place, its exposed wall section is removed to now expose a flat, accurately dimensioned, smooth carbide-binder hard wear surface. When the wear surface becomes worn, the worn pads may be removed by breaking the weldings and then replacing the pads with new pads welded in their place.

9 Claims, 9 Drawing Figures

PRE-FORMED WEAR PADS FOR DRILL STABILIZERS

BACKGROUND OF INVENTION

Drill string stabilizers are commonly used on the steel tubes which carry a drill bit for boring into rocks or the ground or the like. The stabilizers are essentially enlargements which provide a limited surface radially outwardly of the drill supporting tube in order to center the drill string and the drill bit within the bore.

By way of example, bits for drilling through rock are frequently designed to rotate about their own centers so that centering the bits within the bore is necessary in order to insure designed or specified penetration rates as well as to reduce dulling or excess wear upon the bits. In order to maintain concentricity, the drill is centered by means of enlargements formed upon the tubes which support the drill. The enlargements must be radially accurately formed in dimension and preferably maintained at the same radius as is the bit itself in order to guide the bit along the center of the bore. Without stabilization, the drill tubes may move out of concentricity or chatter or bump along the bore walls thereby increasing wear on the bit as well as reducing its efficiency of operation.

Hence, stabilizers are frequently used in drilling deep bores, such as for oil wells, gas wells, as well as for blasting openings and the like.

Although various types of stabilizers are used, one commonly used form comprises raised ribs welded along the drill string sections with these ribs either being straight and aligned with the longitudinal axis of the drill tube or alternatively, spiraled about the tube surface. These rib-type stabilizers are initially made to conform to the radius of the drill and their outside surfaces rub against or otherwise contact the bore walls to maintain concentricity of the string of tubes which support the drill. Such stabilizers may be formed at various spaced apart locations along the drill tube string from the drill bit itself upwardly toward the outer surface of the bore.

Because the exposed surfaces of the rib-type stabilizers drag and scrape and otherwise rub against the bore wall which may comprise either the rock formation or alternatively well casing tubes, there is considerable abrasion which wears the stabilizers rapidly and thus, witin a relatively short period of time, ruins the accuracy of the radial dimensions of the stabilizer surfaces. A number of techniques have been developed in order to reduce the amount of wear or at least to slow it down for longer use of the drill string before replacement of the stabilizers.

One method of increasing the wear resistance of the stabilizer has been to coat the exposed surfaces with tungsten carbide particles brazed thereon so as to resist the abrasion of the bore wall. Thus, the invention herein relates to certain improvements in that type of wear resistant coating.

The present method of forming a carbide type wear resistant coating on rib-type stabilizers is a relatively expensive and time consuming operation. The first step involves preparing the exposed or outer surface of the stabilizers which are formed on a short tube section, to receive carbide. That is, the surfaces of the stabilizer must be suitably cleaned, etc., and then carbide particles in steel tubes or braze metal are gas or arc torch welded or brazed to the surface of a stabilizer. Little by little, along each stabilizer surface, carbide is added through this welding or brazing process and then the layer is built up to required thickness. After each of the stabilizers are appropriately coated with layers of suitable thickness, the tube may then be hand ground to size or may be placed in a grinding machine where it is rotated against a grinding wheel to produce a peripheral surface of the required radius.

This is a slow procedure, involving at least several hours of hand brazing, plus grinding and cleaning and the like which is relatively expensive. The procedure ordinarily must be carried out within a suitable factory having the equipment available and the atmosphere within which brazing may be conducted. Thus, when the carbide hard face stabilizer surface becomes worn so that it is no longer dimensionally acceptable, the stabilizer tube section is normally removed from the drill string and the section is shipped to a factory for re-processing, i.e., cleaning up and re-surfacing and heat treating for stress relief, etc. This is not the kind of procedure that can be carried out in the field ordinarily. When done in the field, the accuracy is subject to the skill of the individual mechanic so that the results are unreliable.

A particular problem involved in this method of hard surfacing, which at times has been done by attempting to melt and adhere upon the surface a mixture of binder or brazing material and carbide supplied in a rod-like form, is the fact that the completed surface is very rough and accurate dimensions cannot be obtained without the final step of grinding. Even there, the grinding does not always produce a good smooth surface and in addition, the fact that the grinding is carried out against hard carbide, results in the rapid wearing out of expensive grinding wheels.

Hence, the invention herein is concerned with hard surfacing the stabilizer surfaces rapidly, inexpensively, with minimal equipment and in a way that the job can be carried out in the field where the oil wells are located or where other types of drilling operations are performed.

SUMMARY OF INVENTION

The invention herein contemplates preforming a wear pad for welding upon the exposed surface of a stabilizer so that the pad can be applied in the field and when worn, can be removed in the field and replaced. The invention contemplates forming the pad out of a flattened, generally rectangular shaped in cross-section, thin wall steel tube which forms a sheath which is filled with a matrix or mixture of carbide particles and a binder, such as a copper alloy or the like. The pad is pre-formed as a thin, narrow, straight strip which may be welded along its narrow sides to the edges of the stabilizer rib.

Since stabilizer ribs are frequently spiraled and the dimensions of the spiral or angularity thereof change in various types of drill equipment, the pads may be applied by heating them with a torch and then hammering them upon the stabilizer to which they are to be attached, as if the stabilizer were an anvil, to thus curve the pad to precisely contact against the stabilizer surface to which it is then welded by means of an edge bead along the side.

The invention herein contemplates that once the pad is secured to the stabilizer, assuming the pad is made to a predetermined accurate thickness, the correct or specified stabilizer radius will be produced. However, in order to expose the wear resistant carbide surface, the exposed wall of the pad is removed, such as by grinding or by cutting or the like. Alternatively, it may be removed, where there is sufficient clearance in the drilled hole, by simply abrading it away during operation. That is, using the stabilizer with its exposed wall in place will result in the exposed wall being ground away by the abrasive action of rock and the like in the bore of the hole so that fairly soon the carbide wear resistant surface is exposed.

As can be seen, because the pad can be simply applied without pre-treating the stabilizer surface and can be removed simply by breaking open the weld with a cold chisel or the like, the application of and removal of these pads can be relatively simply accomplished in the field, even in cold areas such as in the northern parts of the world where well drilling is currently taking place. That is, a worn stabilizer hard face when in the form of the pads herein, can be removed within minutes and replaced again within minutes, by a mechanic who is capable at welding.

Various further objects and advantages of this invention will become apparent upon reading the following specification, of which the attached drawings form a part.

DETAILED DESCRIPTION

Figure 1:
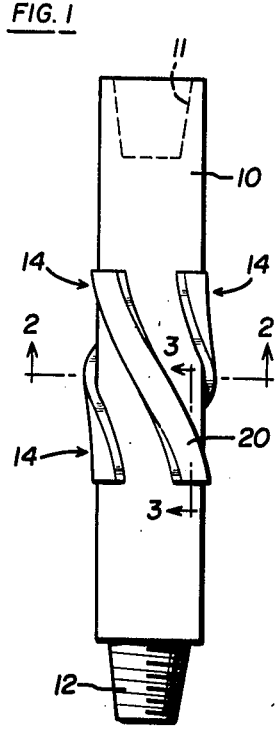
FIG. 1 is an elevational view of a stabilizer tube section.
Figure 2:
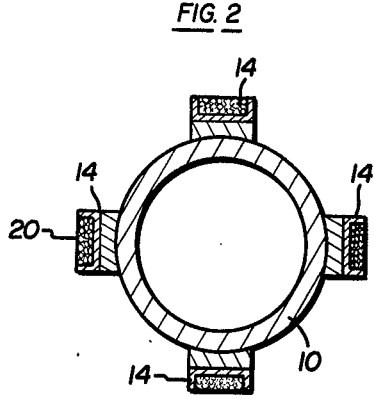
FIG. 2 is a cross-sectional view, to a slightly enlarged scale, taken in the direction of arrows 2—2 of FIG. 1.
Figure 3:
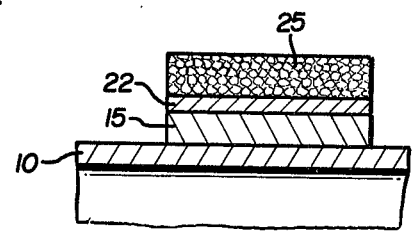
FIG. 3 is an enlarged cross-sectional, fragmentary view taken in the direction of arrows 3—3 of FIG. 1.
Figure 4:
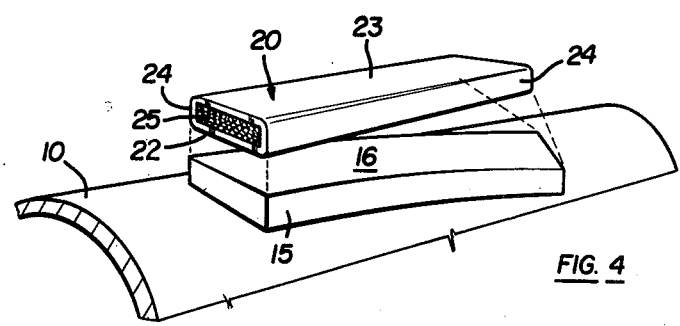
FIG. 4 is an enlarged, perspective view of a single stabilizer rib with a wear pad arranged in position for attachment thereto.
Figure 5:
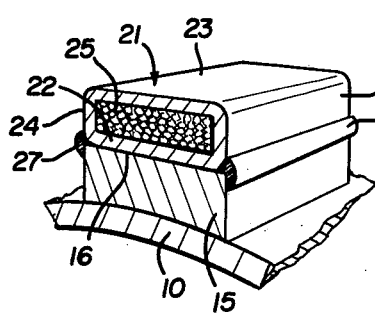
FIG. 5 is a perspective, cross-sectional view showing a complete wear pad welded upon the stabilizer rib.
Figure 6:
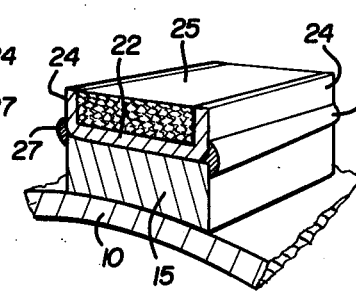
FIG. 6 is a view similar to FIG. 5, but showing the exposed pad wall removed.

FIG. 1 illustrates a typical drill string tube section 10 formed of steel tubing and having an upper threaded internal socket 11 and a lower externally threaded extension 12 for engagement with corresponding extensions and sockets to form a drill string. A drill is secured to one end of the string and the opposite end is power driven for rotating the string and the drill bit.

The section 10 includes rib-type stabilizers 14 which are spirally formed upon the external surface of the tube for stabilizing the tube relatively concentric to the axis of the bore and of the drill bit. The rib-type stabilizers are formed either in spiral shape or at times as straight ribs which are parallel to the axis of the tube.

The stabilizer is formed first of a permanent rib 15 formation which is either formed integral with or welded on to the external surface of the tube 10. The rib is provided with an exposed surface 16 which is long, narrow and is either straight or spiraled depending upon the type of stabilizer used. The hard surfacing is to be applied upon the exposed rib surface 16.

The wear pad 20 is formed of an envelope or sheath 21 which is tubular, flattened and roughly rectangular in cross-section to provide a base wall section 22, an opposite or exposed wall section 23 and interconnecting narrow side walls 24. The sheath may be made of a thin walled tube, such as steel of approximately 1/32-1/16 of an inch wall thickness. The wall thickness may vary considerably depending upon the design requirements.

The sheath or envelope is filled with a solidified mixture of carbide particles bound together and with the gaps therebetween filled with a binder. For example, the carbide particles may be formed of sintered tungsten carbide particles of a mesh size such as 10/20 or 20/30 or 8/10 or the like which particles are packed tightly into the sheath. Either angular or roughly spherical particles can be used depending upon the particular application. The particles are bound together and to the sheath by pouring into the particle filled sheath a suitable binder alloy, such as a commercially available copper based binder alloy used for binding together or brazing together carbide particles.

By way of example of size, the finished filled sheath which makes up the wear pad may be on the order of 12 inches long, ⅜ of an inch thick and perhaps 1 inch wide.

In order to fasten the wear pad upon its respective rib, the pad is laid in surface to surface contact upon the rib. If the rib is new and straight, the pad will normally fit in face to face contact against the exposed surface 16 of the rib. On the other hand, if the rib is spiraled or otherwise somewhat roughened, the rib will not normally fit against it. In that case, the mechanic can heat the pad with a blow torch until it is slightly soft and then position the pad upon the rib and hammer it into face to face contact with the rib to thereby bend the pad as necessary for the close face to face fit.

Of course, the rib can be pre-formed into a curved or spiraled shape at the factory where it is produced and then can be final fitted into close contact with the rib out in the field.

Figure 7:
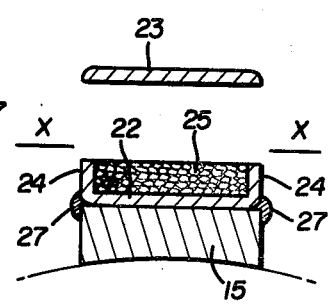
FIG. 7 is a cross-sectional, fragmentary view showing the removal of the exposed pad wall from the pad mounted upon a stabilizer.

After the pad is laid upon the exposed surface of the rib, it is welded thereto, as for example, by means of side welds 27 connecting the narrow side walls 24 of the pad to the sides of the rib. Next, the outer or exposed wall 23 must be removed, as for example along line x—x (see FIG. 7) in order to expose the carbide-binder matrix wear surface. This can be done by cutting, or more easily using a grinder, such as a portable grinder since the thin steel wall can be easily ground away. If the wall is carefully ground away, the exposed matrix will present a smooth, accurate surface which should correspond to the precise exterior radius specified for the stabilizer. The channel or trough formed by the narrow side walls 24 and the base 22 of the sheath function to hold together the matrix to prevent it from shifting or breaking off or otherwise becoming dislodged in use. The free edges of the side walls 24 will be ground away in use to match the wear of the surface 25 of the matrix.

When the wear pad surface becomes unduly worn, the wear pad can be removed simply by breaking the welds 27 with a cold chisel or a grinder or arc cutting rod or some other suitable tool, and thereafter lifting off the pad and replacing it with a new pad which in turn is welded in place by the procedure described above. Thus, replacement of a wear pad can be done within a very short period of time and can be performed even under adverse conditions in the field without difficulty.

Although the grinding away or the removal of the exposed sheath wall 23 is necessary, in many instances, the removal can be effected by letting the wall defining the drilled bore act as the grinder to remove the wall 23. That is, the stabilizer section can be installed in the drilled well bore and during the initial period of rotation the abrasion between the rock formation defining the bore hole and the thin sheet metal wall 23 will wear away the sheet metal rapidly and then expose the carbide matrix. This eliminates the need for carefully grinding away or otherwise removing the wall 23.

Figure 8:
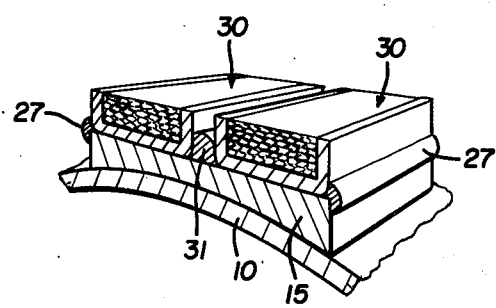
FIG. 8 is a cross-sectional, perspective view of a fragment of a modification which utilizes two narrower wear pads, with a space for welding in between the pads.

FIG. 8 illustrates a modification which utilizes a pair of narrower wear pads 30 which are applied in the manner described above, side by side, but with a slight space between them. Within this space, a third weld bead 31 is applied so that each of the strips or pads are secured in place by the side weld beads 27 as well as the center weld bead 31. For certain types of stabilizer use, there are advantages in using a narrower pair of wear pads as opposed to the single wide one.

Figure 9:
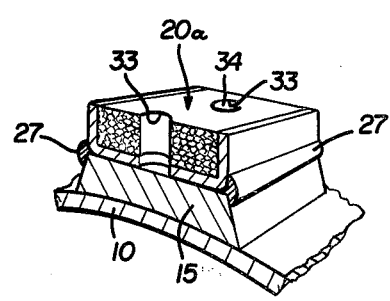
FIG. 9 is another modification showing the wear pad of FIGS. 1-7, but with central openings for applying additional fastener welds.

FIG. 9 shows a second modification which relates to the provision of additional weld points to fasten the wear pad in place. Here, the wear pad 20a is provided with a number of holes, which may be steel lined, extending therethrough which holes 33 are filled with weld material during the time the pad is applied to the stabilizer rib. Hence, the additional material in the holes fastens the pad along its center as well as along its edges.

Having fully described an operative embodiment of this invention, I now claim:

1. A method for hard surfacing rib-type drill string stabilizers comprising the steps of:

making a pre-formed wear pad by forming a thin-wall, tube-like, steel sheath of a length and width to cover the exposed wear surface of a stabilizer rib, and then filling the sheath with a matrix formed of hard carbide-like particles bonded together with a soft binder;

welding the pad upon said exposed wear surface of the stabilizer;

removing the exposed wall portion of the sheath to thereby expose a smooth, accurately dimensioned, carbide-binder hard surface;

wherein an accurate, i.e., radially measured, hard wear surface is formed upon said stabilizers, and wherein said pads can be removed, when worn, by breaking the weldings, and replaced by new pads.

2. The method as defined in claim 1 above, and including heating and physically bending, to the extent necessary, said pre-formed wear pad to accurately fit against and upon said stabilizer wear surface, immediately before welding each pad upon its respective stabilizer surface.

3. The method as defined in claim 1 above, and wherein the sheath is formed in a substantially rectangular cross-section, with one long wall forming a base for face to face engagement with the stabilizer surface, the opposite long wall being the wall to be removed, and the two narrow side walls cooperating with said base to form a shallow channel for confining the matrix filling during use of the stabilizers.

4. A method for applying an accurately dimensioned hard wear-resistant surface upon a drill string stabilizer rib having a flat, narrow, elongated surface which is radially outwardly raised relative to the circumference of the drill string tube section upon which the stabilizer rib is formed, comprising the steps of;

positioning upon the stabilizer surface a pre-formed wear pad which is formed of a flattened, roughly rectangular-in-cross-section, tube-like, thin-wall, steel sheath which is filled with a solidified matrix of hard carbide particles bound together by a soft metal binder, with one of the wider walls placed into face to face contact with the stabilizer surface and the opposite wider wall being exposed;

welding the pad to the stabilizer along the length of the pad;

removing the exposed wider wall to thereby expose a radially accurately dimensioned, smooth, carbide particle-binder surface which forms a hard, wear resistant surface coating upon the stabilizer surface;

and wherein the opposite narrower walls of the sheath and the remaining wider wall form an elongated, rigid channel to hold and confine the matrix against loosening or dislodgement during use of the stabilized drill string.

5. A method as defined in claim 4, and wherein said stabilizers are each spiraled around the peripheral surface of its respective tube section;

and said pads being initially formed straight and including the step of heating and bending the pad to accurately conform to the surface contour of its respective stabilizer.

6. A method as defined in claim 4, and wherein the removal of said exposed wider wall is effected by the abrasive grinding of said wall against the drilled bore interior wall surface during the initial period of use of the stabilizer within a drilled bore.

7. A method as defined in claim 4, and wherein said exposed wider wall is removed by grinding it away after the pad is welded in place, but before use of the stabilizer within a bore.

8. A pre-formed wear pad for hard surfacing a drill string rib type stabilizer comprising;

an elongated, flattened, approximately rectangular in cross-section shape, tube-like, thin-wall sheath having one of its wider wall sections forming a base of a length and width to substantially cover, in face-to-face contact, the exposed surface of said stabilizer, and with its narrow side wall sections cooperating with said base to form a rigid channel;

said sheath being filled with a solid mixture of closely packed hard carbide particles bound together, and with the gaps therebetween filled, with a relatively soft metal binder material;

said elongated pad, i.e., the filled sheath, being forceably bendable upon being heated sufficiently, into close fitting face to face contact with a stabilizer surface upon which the pad is to be secured;

and said pad being weldable along its narrow side walls, by conventional welding means to a stabilizer, and the sheath exposed wider wall section located opposite to its base wall section being removable after the pad is welded to a stabilizer, such as by means of grinding it away either before the stabilizer is used within a bore or by means of the abrasive grinding action of the bore wall against the exposed wall section to be removed, so that the resulting rigid channel form will confine the solid filling in an accurately radially dimensioned hard surface shape, and so that the pad upon becoming worn may be removed and replaced by disengaging its weldings.

9. A pre-formed wear pad as defined in claim 8 above, and wherein said pads are formed straight, wherein said pads are adapted to be heated and physically bent into the shape of a stabilizer upon which it is to be mounted at the time of such mounting.

* * * * *